United States Patent [19]

Kavanagh et al.

[11] Patent Number: 5,024,895
[45] Date of Patent: Jun. 18, 1991

[54] LAMINATE FOR A SAFETY GLAZING

[75] Inventors: Dean L. Kavanagh; Robert H. M. Simon, both of Longmeadow, Mass.

[73] Assignee: Monsanto Company, St. Louis, Mo.

[21] Appl. No.: 539,252

[22] Filed: Jun. 18, 1990

[51] Int. Cl.⁵ .............................................. B32B 17/10
[52] U.S. Cl. .................................... 428/437; 428/480;
428/473.5; 428/423.1; 428/412; 428/457;
428/458; 350/1.1; 350/1.6
[58] Field of Search ............ 428/437, 480, 426, 473.5,
428/423.1, 412, 500, 457, 458; 350/1.1, 1.6

[56]  References Cited
U.S. PATENT DOCUMENTS

| | | | |
|---|---|---|---|
| 4,020,126 | 4/1977 | Gander et al. | 260/873 |
| 4,368,945 | 1/1983 | Fujimori et al. | 350/1.7 |
| 4,465,736 | 8/1984 | Nishihara et al. | 428/332 |
| 4,952,258 | 8/1990 | Grolig et al. | 156/99 |

FOREIGN PATENT DOCUMENTS 0157030 9/1985 European Pat. Off. .
0304898 1/1989 European Pat. Off. .
0326015 2/1989 European Pat. Off. .

Primary Examiner—Merrell C. Cashion, Jr.
Assistant Examiner—Don Sumihiro
Attorney, Agent, or Firm—Michael J. Murphy; William J. Farrington

[57] ABSTRACT

A flexible, draw-formed laminate for a safety glazing comprising a transparent, thermoplastic carrier film which is shrink-stable during laminating formation of such safety glazing bonded to at least one layer of plasticized polyvinyl butyral, such film having a greater tensile modulus than that of the layer of plasticized polyvinyl butyral. The carrier film is preferably flexible polyester such as polyethylene terephthalate having one or more functional performance coatings or layers on its surface such as a multi-layered solar radiation control stack.

7 Claims, 2 Drawing Sheets

LAMINATE FOR A SAFETY GLAZING

BACKGROUND OF THE INVENTION

This invention relates to a laminate for a safety glazing and more particularly to a laminate which is shrink-stable during formation of such a glazing.

It is known to use an energy absorbing interlayer of plasticized polyvinyl butyral (PVB) with one or more rigid layers such as glass in a safety glazing. Such a glazing is usually prepared by interposing the PVB layer between glass sheets while eliminating air from between the engaging surfaces and then subjecting the assembly to elevated temperature and pressure in an autoclave to fusion bond the PVB and glass and form an optically clear structure. These glazings are used in windows such as the front, side and rear windows in motor vehicles, particularly windshields, where the interlayer can absorb a blow from the head of an occupant without penetration of the windshield.

In recent years additional sophisticated features are appearing in such windows to enhance performance. These include special, layered metal/dielectric stacks for solar radiation control which may be electrically conductive for defrosting, defogging, etc; holographic layers as solar reflecting mirrors and in head-up displays to facilitate viewing instruments on the vehicle dashboard while looking straight ahead; photochromic and electrochromic layers which controllably change color on exposure to solar radiation or application of a voltage; layered protective antilacerative structures on the inboard side of a conventional three layer glass/PVB sheet/glass laminate to minimize lacerations from sharp edges of broken glass; special plastic layers in bilayer structures replacing one glass layer of such a three layer glass laminate, and similar, functional performance-enhancing layers and coatings. These performance layers are usually deposited on or adhered to a carrier layer which is different from the low modulus, elastomeric PVB which is unsuitable as a carrier. For use in safety glazings a carrier layer should have good clarity, be relatively uniform in thickness and strong having high modulus to facilitate ease of handling and processing during association with the performance layer(s). Frequently biaxially oriented polyethylene terephthalate is used as noted, for example, in U.S. Pat. No. 4,465,736.

Concurrent with these performance advances, window shapes are appearing having severely curved and angled configurations serving, for example, to minimize aerodynamic drag and enhance ability to see from within the vehicle. When forming a safety glazing of such complex curvature having a PVB layer and a carrier layer of the type referred to, problems occur with the carrier layer. More specifically, when planar plastic layers on or between rigid sheet(s) such as glass having the desired complex curvature are heated to bond the PVB to the rigid sheet(s), the flat carrier layer cannot perfectly conform to the complex curvature without stretching, in the absence of which it forms wrinkles, folds or pleats (collectively "wrinkles"), usually, though not necessarily, in one or more sections near the periphery of the glazing laminate. These visually apparent wrinkles are an optical defect in the safety glazing. Wrinkling is not encountered with conventional safety glazings using only plasticized PVB which readily flows between the rigid sheets and evens out in thickness during autoclave laminating.

To avoid wrinkling, published European Application No. 0304898 discloses forcing a planar collection of plastic layers secured to each other against and adhesively pres bonding them to a curved glass layer followed by autoclave bonding of the assembly to form the safety glazing. This approach combines plastic film forming with glass bonding and handling which are quite different operations usually found separated in the safety glazing industry where film manufacture and supply is by a plastic fabricator and glazing manufacture by a glass laminator.

It would be desirable to provide a layered plastic prelaminate which could be interchangeably used in the same way as a single layer of plasticized PVB in conventional autoclave laminating to provide a safety glazing with enhanced properties where unsightly wrinkling is avoided.

SUMMARY OF THE INVENTION

Now, improvements have been made in plastic laminates for use in safety glazings having compound curvature and enhanced performance properties which mitigate wrinkling problems encountered in the prior art.

Accordingly, a principal object of this invention is to provide a laminate containing enhanced functional performance layer(s) or coating(s) which displays minimal or no edge wrinkling during laminating formation of a safety glazing.

Another object is to provide a plastic laminate usable in a conventional deairing/autoclave laminating operation to form a substantially wrinkle-free vehicle window having compound curvature.

Other objects will in part be obvious from the following description and claims.

These and other objects are accomplished by providing a flexible, draw-formed laminate for a safety glazing comprising a transparent, thermoplastic carrier film, preferably polyethylene terephthalate, which is shrink-stable during laminating formation of said safety glazing, bonded to at least one layer of plasticized polyvinyl butyral, such film having a greater tensile modulus than that of the layer of plasticized polyvinyl butyral.

BRIEF DESCRIPTION OF THE DRAWINGS

In describing the overall invention, reference will be made to the accompanying drawings wherein.

DETAILED DESCRIPTION OF PREFERRED EMBODIMENTS

Figure 1:
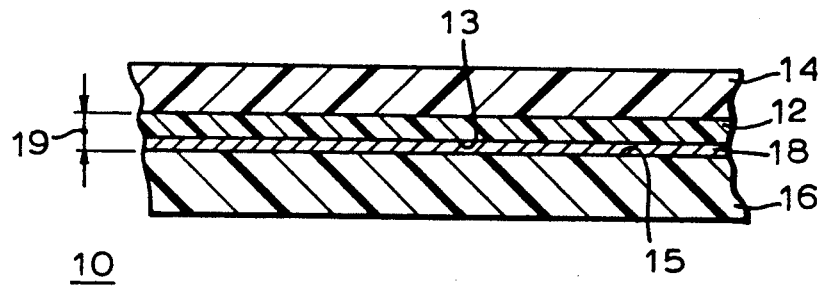
FIG. 1 is a partial, sectional view in enlarged detail of a draw-formed laminate embodiment of the invention.

Referring now to the drawings, flexible, draw-formed laminate 10 in FIG. 1 is usable with one or more rigid panels such as glass sheets, not shown, in a safety glazing. Laminate 10 comprises transparent, thermoplastic carrier layer or film 12 having a non-critical thickness of about 0.5 to 8 mils (0.013 to 0.20 mm), preferably 1 to 4 mils (0.025 to 0.1 mm) and most preferably 2 mils (0.05 mm), which is sufficiently stress-relieved and shrink-stable in a manner to be further described as to avoid substantial wrinkling during elevated temperature laminating formation of the safety glazing. Layer 12 in the embodiment shown is bonded on one side to at least one layer 14 and preferably as well on the other side (with 18 interposed therebetween) to layer 16 of plasticized polyvinyl butyral, typically about 5 to 30 mils (0.13 to 0.76 mm) in thickness. Layers 14, 16 may be of the same or different thickness and be textured or roughened on either or both unbonded outer surfaces by known techniques to facilitate deairing during formation of the safety glazing. Layer 12 on the carrier surface of one side 13 has one or more overlying adherent functional performance layers and/or coatings 18 between side 13 of layer 12 and side 15 of layer 16 (hereinafter called "performance layer") of the type previously described having properties enhancing performance of the safety glazing. The combination of carrier layer 12 and performance layer 18 is numbered 19 and hereinafter called "coated film". The preferred form of 18 is a multi-layer optically functional solar radiation control stack of one or more metal and two or more cooperating dielectric layers of which the metal layer(s) may optionally be electrically resistance heated for defrosting or defogging of associated glass layers in a vehicle window.

Before bonding to form laminate 10, one or both sides of layers 14, 16 and/or carrier layer 12 and/or performance layer 18 may be surface treated or coated to promote interfacial adhesion such as, for example, by flame or plasma exposure, sputter deposition of a metal oxide, application of an appropriate adhesive or the like.

Carrier layer 12 has properties to maintain its integrity during handling and applying performance layer 18 to its surface as well as subsequent bonding, molding and laminating steps (to be further described herein) and as an integral part of the end use safety glazing product. To satisfy such performance requirements, carrier layer 12 is optically transparent (i.e. objects adjacent the layer on one side can be comfortably seen, without distoration, by the eye of a particular observer looking through the layer from the other side) and has a tensile modulus regardless of composition which will always be greater, preferably significantly greater, than that of plasticized polyvinyl butyral layers 14, 16. Among plastic materials having these physical properties and therefore suitable as carrier layer 12 are nylons, polyurethanes, acrylics, polycarbonates, polyolefins such as polypropylene, cellulose acetates and triacetates, vinyl chloride polymers and copolymers and the like. Preferred materials are pre-stretched thermoplastic films having the noted properties which include polyesters such as polyalkylene terephthalate. Most preferred is polyethylene terephthalate (PET) which has been biaxially stretched to improve strength. The tensile modulus (at 21-25° C.) of polyethylene terephthalate is about $10^{10}$Pa as compared with about $10^7$Pa for plasticized polyvinyl butyral of the type used in safety glazings. Unfortunately, though this tensile modulus property is desirable, it is also responsible for layer 12 resisting stretching which contributes to the wrinkle formation sought by the present invention to be avoided.

To facilitate bonding of the various disparate layers usable in laminate 10, or for some other functional purpose, more than one identical or different coated or uncoated carrier layer 12 may be used in laminate 10. Various coating and surface treatment techniques for PET carrier film are disclosed in published European Application No. 0157030, pages 4 and 5, incorporated herein by reference.

Figure 3:
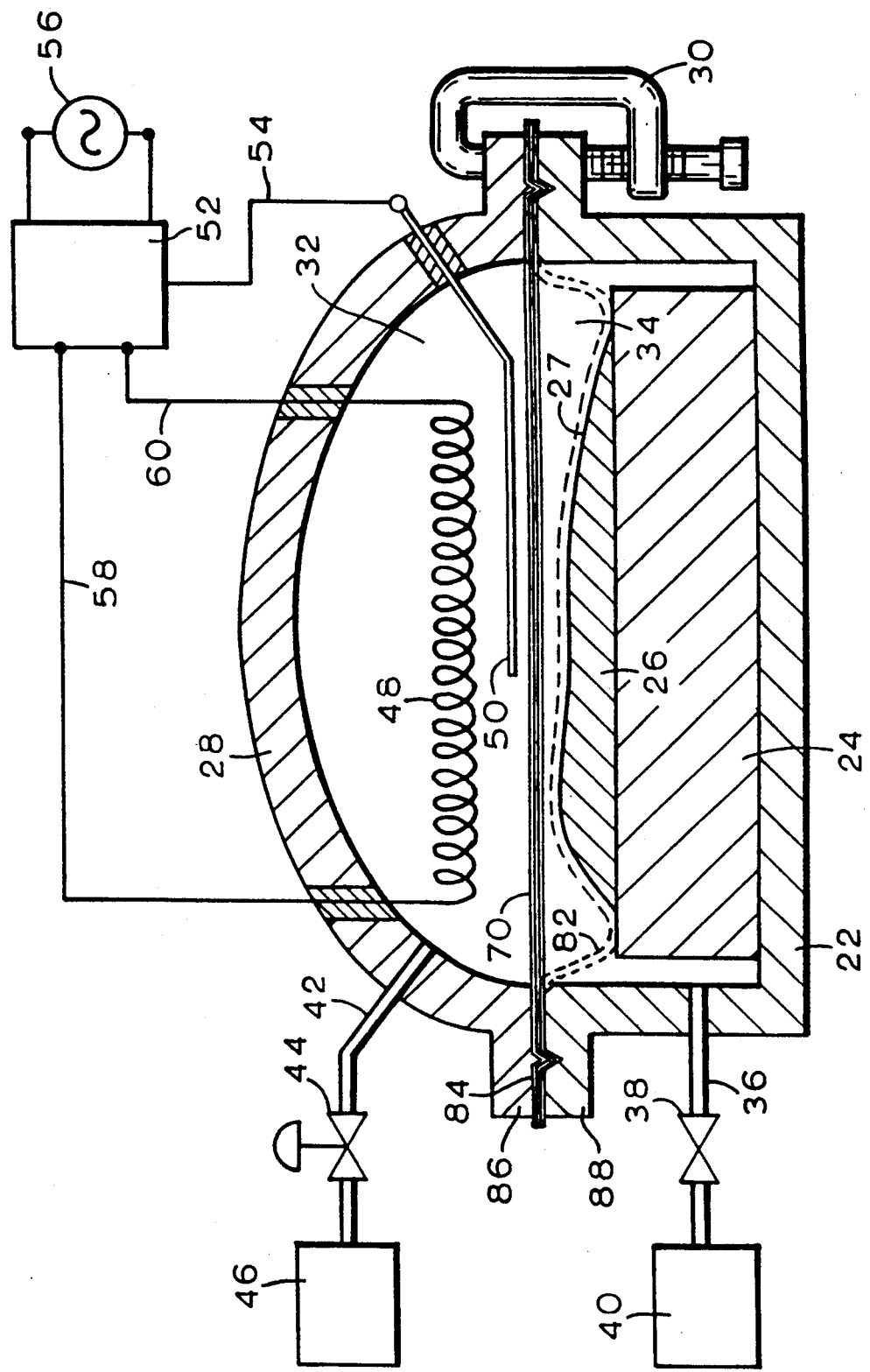
FIG. 3 is a view similar to FIG. 2 of apparatus useful in practicing the process of the invention.

Turning to FIG. 3, a representative form of apparatus 20 is shown for use in practicing the process of the invention. Apparatus 20 comprises base 22 supporting bed 24 on which shaping mold 26 is mounted having a surface schematically shown as 27 possessing compound curvature. As used herein, a surface with compound curvature requires some degree of stretching of a flat, planar thermoplastic layer in conforming such layer into perfect surface to surface contact with it. By this definition, spherical curvature, for example, is compound curvature. Mold surface 27 can be cooled (e.g. by circulating cooling water through channels, not shown, in mold 26) or coated with an appropriate antistick agent such as Teflon ® to minimize unwanted sticking of plastic to surface 27 during the molding cycle to be shortly described. Lid 28, secured by a plurality of clamps 30 to base 22, forms with base 22 hermetically sealed upper chamber 32 and lower chamber 34. When isolated, lower chamber 34 may be reduced in pressure through line 36 containing valve 38 communicating with negative pressure source 40. Similarly, upper chamber 32 may be pressurized through line 42 containing control valve 44 communicating with source 46 of compressed air or nitrogen. Radiant heater 48 is positioned in upper chamber 32 to evenly heat unshaped premolding composite 70, to be further described. Thermocouple 50 between heater 48 and premolding composite 70 is preferably as close as possible to the upper surface of composite 70 without touching it. Line 54 delivers the signal from thermocouple 50 to temperature controller 52. Depending on temperature set point, controller 52 feeds appropriate electric power to heater 48 from power source 56 through leads 58, 60.

Figure 2:
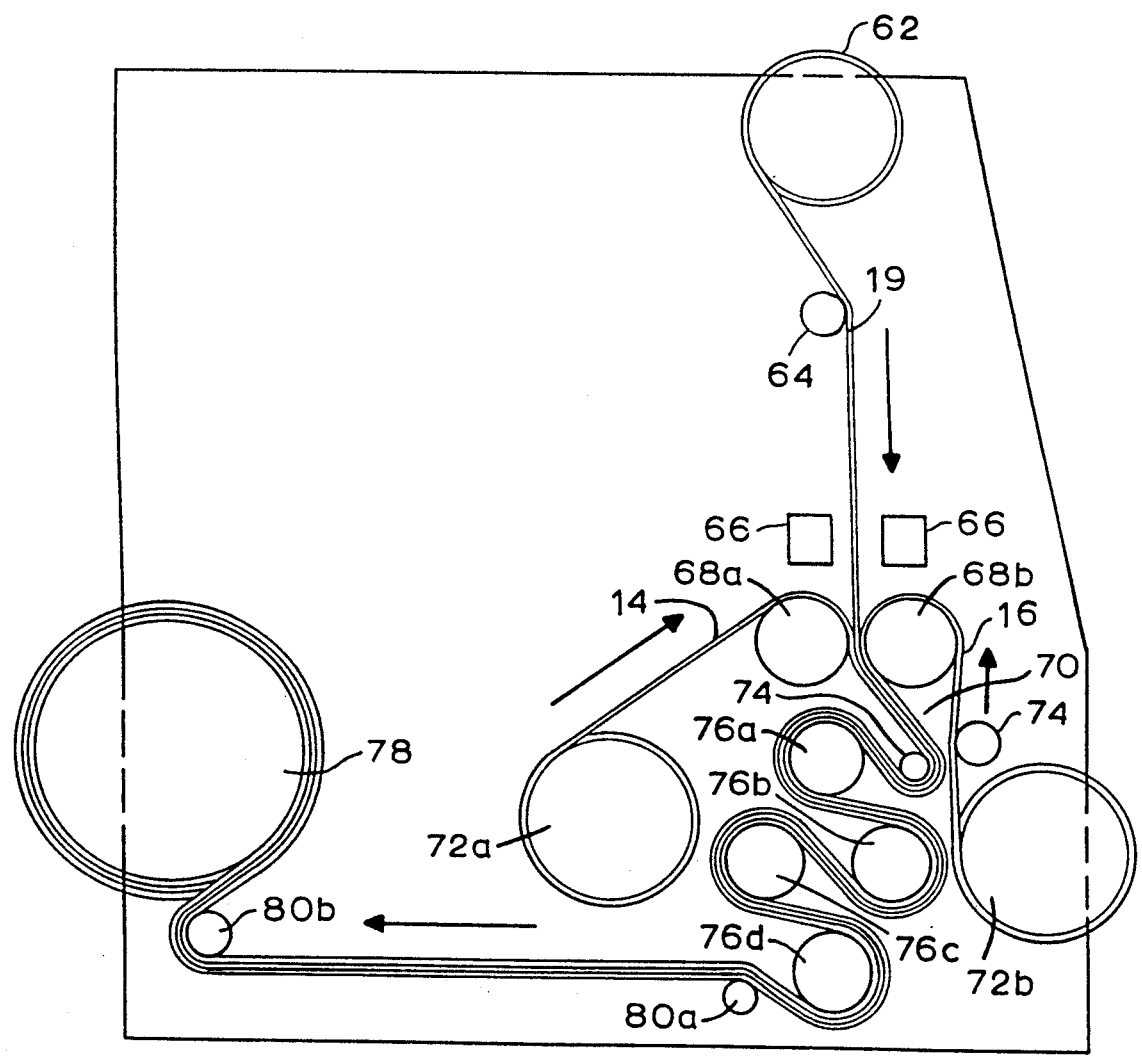
FIG. 2 is an elevational schematic view of a system initially bonding layers of the laminate of FIG. 1.

The process will now be described for forming shaped laminate 10 (FIG. 1) for use in a safety glazing such as a vehicle window or the like. FIG. 2 illustrates a nip roll press bonding system for encapsulating coated or layered carrier film 12 within PVB layers 14, 16. Carrier layer 12 as flexible, transparent biaxially oriented polyethylene terephthalate film carrying a solar radiation control metal/metal oxide stack (19 in FIG. 2,) is supplied from roll 62 and first passed over tension roll 64. Coated film 19 is subjected to moderate surface heating in stations 66 which are positioned to gently heat either coated film 19, plasticized PVB sheets 14, 16 or both. Heating is to a temperature sufficient to promote temporary fusion bonding in that the thermally softened surfaces of outer layers 14, 16 become tacky. Suitable temperatures for these preferred materials are in the range of 50 to 121° C., with the preferred surface temperature reaching about 65° C.

Coated film 19 and plasticized PVB layers 14, 10 are fed into the laminating nip between oppositely rotating press rolls 68a, 68b where the three layers are merged together to expel air and encapsulate coated film 19 within PVB layers 14, 16 and form lightly bonded premolding composite 70. Layers 14, 16 are supplied from rolls 72a, 72b and a tension roll 74 can be included in the PVB layer supply line. If desired, press rolls 68a, 68b can be optionally heated to promote bonding. The bonding pressure exerted by press rolls 68a, 68b can be varied depending on the film materials chosen and bonding temperature employed but generally will range from about 0.7 to 5.3 kg/sq cm, preferably about 1.8-2.1 kg/sq cm. The tension of premolding composite 70 is controlled by passage over idler roll 74. Typical line speeds through the FIG. 2 assembly are from 5 to 30 ft/min (1.5 to 9.2 m/min).

After bonding between press rolls 68a, 68b, premolding composite 70 passes over a series of cooling rolls 76a, 76b, 76c, 76d to insure that the composite accumulated on roll 78 is not tacky. Process water cooling is generally sufficient to achieve this objective. Tension in the roll system is further maintained by idler rolls 80a and 80b. The between layers of about 0.4–0.9 kg per linear cm when tested according to a standard 180° peel test. This is considered sufficient strength to avoid delaminating during normal handling and further processing of the premolding composite.

Returning to FIG. 3, successive flat, planar sections of premolding composite 70 containing coated film 19 as a component are gripped along margins 84 via clamps 30 between mating flanges 86, 88 of cover 28 and base 22. Heater 48 is energized to raise the temperature of composite 70 as registered by thermocouple 50 at a suitable rate to the predetermined shaping temperature. When shaping temperature is reached, negative pressure is created within lower chamber 34, and/or pressure is developed in upper chamber 32. These conditions draw and stretch composite 70 against molding surface 27 of shaping mold 26 to impart compound curvature thereto and form a shaped and, at this point, shrinkable laminate illustrated in dotted lines as 82, on mold surface 27 to which such laminate conforms, while margin 84 remains clamped between flanges 86, 88. Alternatively, by appropriately increasing the negative and/or positive pressure in chamber 32, 34 stretching of the composite as just described can be achieved without initial heating to elevated shaping temperature, i.e. stretching could be performed at room temperature of about 20–30° C.

Heater 48 by signal from controller 52 then increases the temperature of shaped, shrinkable laminate 82 to a predetermined level which is above the initial shaping temperature and at least about equal to and preferably above the maximum use temperature subsequently encountered during autoclave laminating, while continuing constraint of the edges of margin 84. Shaped laminate 82 is held against mold surface 27 at such predetermined temperature as developed by heater 48 and controller 52 for a predetermined time sufficient to relieve stresses developed in laminate 82 during the prior stretching step and insure satisfactory heat setting of the carrier film component according to the invention. Timetemperature conditions adequate to achieve heat setting according to the invention will vary but will generally be between about 110 to 180° C. for about 30 sec to 100 min. After heat setting, the power to heater 48 is reduced and the stress/relieved, shaped laminate allowed to cool on mold surface 27 to room temperature while still maintaining margins 84 constrained between flanges 86, 88. Chambers 32, 34 are then vented to atmospheric pressure via appropriate vent valves, not shown, and clamps 30 removed to permit separating base 22 and lid 28. Draw-formed laminate 10 (FIG. 1) now containing shrink-stable (i.e. wrinkle-resistant during subsequent deairing and autoclave laminating) carrier film 12 is then removed from mold surface 27 and edge trimmed in preparation for deairing and autoclave laminating between cooperating glass sheets, not shown, having compound curvature matching that imparted to laminate 10 by mold surface 27. Thus, using draw-formed laminate 10, deairing and autoclave lamination without edge constraint provisions can be carried out in the same manner using the same prior art systems as in forming conventional safety glazings containing a single layer of PVB sheet. In this regard, though free to move, the edges of the various layers including carrier layer 12 of shaped laminate 10 do not significantly move and therefore behave just as does a single layer of plasticized PVB in the laminating line. Thus, shaped laminate 10 prepared, for example, by a plastic fabricator can be shipped to a glass laminator for use in the laminator's conventional autoclave laminating with at least one and preferably two transparent rigid panels of matching shape and, by squeezing between rollers or drawing negative pressure on the assembly within a vacuum bag, air is withdrawn from the abutting interfaces of the rigid panels and matching laminate while heating commences to initially tack the PVB and glass surfaces together. Elevated temperature not significantly exceeding the temperature of the laminate during prior heat setting and elevated pressure is then developed in known manner to fusion bond the PVB and glass and form a delamination-resistant safety glazing having compound curvature and containing substantially wrinkle-free carrier layer 12.

During autoclaving, encapsulating layers 14, 16, of plasticized PVB of laminate 10 cooperate in reducing wrinkling by exerting a viscous drag effect on the carrier layer thereby retarding carrier layer shrinkage.

The following Examples illustrate more clearly the principles and practice of the invention to one skilled in the art. There is no intention to be restrictive but merely illustrative of the invention herein disclosed.

EXAMPLES 1-7

A flexible, transparent, thermoplastic carrier layer having a multi-layer, solar radiation control stack adhered on one side was obtained from Southwall Technologies Inc. of Palo Alto, Calif. as Heat Mirror ™-XIR-70-2. The carrier layer was 2 mil (0.051 mm) thick polyethylene terephthalate (PET) film obtained from Hoechst Celanese Corp. as Hostaphan ® 4300-200 which had been biaxially oriented by stretching approximately equally in the longitudinal and transverse directions in the plane of the film and subsequently dimensionally stabilized by heating under tension to about 200–250° C. for about 1 to 3 sec. One side of this PET film was coated with a thin layer of polymethyl methacrylate (PMMA) to minimize sticking of the film. The solar control stack was about 2000A thick and comprised five to seven successive sputter-deposited alternate layers of silver metal and tin-indium oxide dielectric material, further details of which are described in U.S. Pat. No. 4,799,745, incorporated herein by reference. This initial heat setting of the biaxially oriented PET film according to known prior art teachings (see for example U.S. Pat. No. 4,469,743, col. 2, lines 54–59) minimizes or avoids dimensional changes in the film with temperature during treatment and deposition of the solar stack on the surface of the film and bonding to PVB sheet. As disclosed, for example, in published Japanese Patent No. 60-228545, the side of the PET film without the stack was plasma treated using oxygen to improve the adhesive strength of the PET film.

Using the system of FIG. 2, the coated carrier film was encapsulated within and lightly bonded to two 15 mil (0.38 mm) thick layers of plasticized polyvinyl butyral available from Monsanto Co. as Saflex ® TG sheet to form a premolding composite. Sixteen inch (40.6 cm) square sections of this composite were then prepared for processing in apparatus such as depicted in FIG. 3. Each section was peripherally clamped within a gripping assembly which circumscribed a 15 in. (38.1 cm) diameter circle. The region within the clamped periphery of the composite was heated in a sealed chamber to a shaping temperature of about 79–82° C. as measured by a thermocouple in close proximity to the surface of one of the outer PVB layers, using radiant heat from an infra-red heater mounted above the clamped composite. Negative pressure of 28 in. (71.1 cm) Hg was then developed on one side of the clamped composite to draw the heated region within the clamped periphery down over the surface of a metalfilled epoxy male or female mold of spherical shape generally in the form of a watchglass 12.5 in. (31.8 cm) diameter, 1.6 in. (4.1 cm) deep having a 13 in. (33.0 cm) radius of curvature. This axially shallow, peripherally large configuration was considered representative of that to be typically encountered in a modern motor vehicle windshield design. Such drawing imparted compound curvature to the shaped composite containing the PET carrier film which, if unrestrained, would be susceptible to immediate shrink-back toward its initial, unstretched shape as the stresses developed during this stretching relieve. With the periphery of the thus-shaped laminate restrained against movement within jaws of the clamping assembly and while holding the shaped laminate in contact with the molding surface, the radiant heater continued heating the laminate for 10 to 100 min. to increase its temperature as measured by the thermocouple to between 121–163° C. As described above, this heating was to dimensionally stabilize the PET carrier layer by relieving stresses developed during the prior stretching step. Pressure on the laminate during this time (e.g. in chamber 32 via source 46 and valve 44) was 45 psig (310kPa). The maximum temperature to which the laminate may be heated varies with this pressure and should be below that causing water vapor and plasticizer vaporization from the PVB since this will result in undesirable bubbles and plasticizer loss. This is about 130° C. at atmospheric pressure and can be somewhat higher if pressure is imposed on the stretched sheet during heating. The heater was then turned off and the shaped laminate allowed to cool over about 30 min to about 26–30° C. after which the clamping jaws were released and the flexible, drawformed laminate removed from the mold surface. Excess material outward of the mold edge was trimmed off and the laminates were placed between two matching 90 mil (2.3 mm) thick bent glass sheets conforming in surface shape to that of the molding surface (31.8 cm diameter, 4.1 cm deep, 32.5 cm radius of curvature) and therefore to that of the draw-formed laminate. The peripheral edge of a shaped laminate between the glass sheets was unrestrained and free to move.

The glass/shaped laminate/glass assembly was placed in a rubberized fabric vacuum bag which in turn was placed in an autoclave chamber. A vacuum (71.1 cm Hg) was applied within the bag to remove air from between mating glass-plastic interfaces while the atmosphere within the chamber was gradually heated to 121° C. As the shaped laminate within the heating chamber increased in temperature each PVB layer lightly bonded or tacked to each abutting glass layer. Pressure within the autoclave was increased to 180 psig (1224kPa) while maintaining 121° C. and these autoclave laminating conditions were maintained for about 20 min. to establish the strong PVB-glass fusion bond of a safety glazing. The optically transparent safety glazing samples having compound curvature representative of that encountered in a modern vehicle window were then cooled to room temperature, removed from the vacuum bag and visually examined for the presence of edge wrinkles in the PET carrier layer. Results were as follows:

| Example | Stretch Temp. °C. | Heat Set Temp.[1] °C. | Hold Time[2] min. | Autoclave Temp. °C. | Wrinkles? | Mold |
|---|---|---|---|---|---|---|
| 1 | 26.7 | 121.1 | 100 | 121.1 | No | Male |
| 2 | 23.9 | 121.1 | 60 | 121.1 | No | " |
| 3 | 32.2 | 154.4 | 10 | 121.1 | No | " |
| 4 | 23.9 | 160.0 | 10 | 143.3 | Yes | " |
| 5 | 82.2 | 160.0 | 10 | 121.1 | No | " |
| 6 | 23.9 | 162.7 | 10 | 121.1 | Slight | Female |
| 7 | 48.9 | 121.1 | 10 | 121.1 | Yes | Male |

[1]Temperature of the stretched laminate at the noted hold time.
[2]Time stretched laminate held in contact with the mold surface.

In Examples 4 and 7, not according to the invention, pronounced, visible edge wrinkles were about 2.5 to 3.1 cm inward of the edge of the glass around the full periphery of the safety glazing. As apparent from the remaining Examples, heat setting of the carrier layer adequate to relieve stresses developed during shaping and avoid or minimize subsequent wrinkling is a time/temperature function, with time being an inverse function of temperature. Thus, in Examples 1 and 2, a laminate held at 121° C. for 60–100 min was sufficiently heat set and the PET carrier layer was sufficiently dimensionally stabilized against shrink-back from relaxation of stresses induced during stretch-shaping that no visible wrinkling occurred during deairing/autoclave laminating. Similar favorable results occurred in Example 3 where hold time was reduced to 10 min by heating to a higher heat set temperature. Example 7 conditions, however, (10 min @ 121° C.) were insufficient to produce a wrinkle-resistant carrier layer during subsequent processing in that stresses imparted during shaping and remaining in the carrier layer due to insufficient heat setting relaxed causing shrinkage and visible wrinkling due to buckling of the carrier layer when the shaped laminate was exposed to 121° C. during autoclaving.

Example 4 is representative of the effect on carrier layer wrinkling of the relationship between downstream autoclave temperature and heat set conditions. At the 143° C. autoclave temperature, unrelaxed stresses introduced into the carrier film most likely during initial formation of the biaxially stretched PET film at about this 143° C. temperature (vis-a-vis 121° C. in Example 3) relaxed sufficiently to generate wrinkles in the shaped laminate with its unrestrained edges during deairing/autoclaving, the 10 min, 160° C. heat setting conditions being too mild to relax such stresses and prevent wrinkling from occurring. This contrasts with the wrinkle-free results of Example 3 using the same PET film carrier layer but a lower 121° C. autoclave temperature where 145° C., 10 min heat set conditions were adequate. In other words, stresses present in the PET film of Example 3 introduced at temperatures greater than 121° C. were unrelieved at the 121° C. autoclave temperature and therefore did not result in wrinkling.

The preceding description is for illustration only and is not to be taken in a limited sense. Various modifications and alterations will be readily suggested to persons skilled in the art. It is intended, therefore, that the foregoing be considered as exemplary only and that the scope of the invention be ascertained from the following claims.

We claim:

1. A flexible, draw-formed laminate capable of conforming to a surface with compound curvature for use in a safety glazing comprising a transparent, thermoplastic carrier film which is shrink-stable during laminating formation of said safety glazing, bonded to at least one layer of plasticized polyvinyl butyral, said film having a greater tensile modulus than that of the layer of plasticized polyvinyl butyral.

2. The laminate of claim 1 wherein the thermoplastic of the film comprises polyester.

3. The laminate of claim 2 wherein the polyester is polyalkylene terephthalate.

4. The laminate of claim 3 wherein the polyalkylene is polyethylene.

5. The laminate of either of claims 1 or 4 wherein the film is sufficiently stress-relieved to avoid substantial wrinkling during elevated temperature laminating formation of the safety glazing.

6. The laminate of claim 5 wherein the thermoplastic film is interposed between and bonded to two layers of plasticized polyvinyl butyral.

7. The laminate of claim 6 wherein the bonded thermoplastic film has a carrier surface on which is deposited one or more metal layers and one or more cooperating adherent dielectric layers defining a solar radiation control stack.

* * * * *

UNITED STATES PATENT AND TRADEMARK OFFICE
CERTIFICATE OF CORRECTION

PATENT NO. : 5,024,895

DATED : June 18, 1991

INVENTOR(S) : Dean L. Kavanagh, Robert H. M. Simon

It is certified that error appears in the above-identified patent and that said Letters Patent is hereby corrected as shown below:

In col. 4, line 49, delete "10" and insert ---16---.

In col. 5, line 4, after the word "The", insert ---resulting premolding composite 70 has a bond strength---.

In col. 6, line 6, before the word "with", insert ---systems. In brief shaped laminate 10 is associated---.

Signed and Sealed this

Twenty-fourth Day of November, 1992

Attest:

DOUGLAS B. COMER

*Attesting Officer*  *Acting Commissioner of Patents and Trademarks*